United States Patent [19]

Smith et al.

[11] 4,047,036

[45] Sept. 6, 1977

[54] STRIP PROFILE MEASUREMENT

[75] Inventors: Kenneth Browning Smith, Tuffley; Derek William Adams, Cheltenham, both of England

[73] Assignee: Heath (Gloucester) Ltd., Gloucester, England

[21] Appl. No.: 680,558

[22] Filed: Apr. 27, 1976

[30] Foreign Application Priority Data

May 10, 1975 United Kingdom ............... 19743/75

[51] Int. Cl.² ........................................... G01N 23/16
[52] U.S. Cl. ............................... 250/359; 250/358 R; 250/407
[58] Field of Search ................... 250/358 R, 359, 360, 250/313, 314, 401, 407

[56] References Cited

U.S. PATENT DOCUMENTS

| 3,665,184 | 5/1972 | Schagen | 250/313 |
| 3,944,833 | 3/1976 | Hounsfield | 250/360 |
| 3,955,086 | 5/1976 | Tsujii et al. | 250/358 R |

Primary Examiner—Archie R. Borchelt
Attorney, Agent, or Firm—William R. Sherman; Kevin McMahon; Martin M. Novack

[57] ABSTRACT

A radiation gauge for measuring the profile of a moving strip, e.g. strip issuing from a strip rolling mill, comprises two X-ray tubes arranged on one side of the strip. The X-ray tubes are connected in push-pull configuration, for pulsing in alternation, and they each produce a respective curtain of radiation which intersects the strip in a respective straight line extending across the width of the strip, perpendicular to its direction of travel: these two straight lines are aligned with each other and overlap slightly in the center of the strip. A linear array of radiation detectors is disposed on the other side of the strip, so as to receive the radiation which passes through the strip. Signal processing circuitry processes the detector output signals to display the deviation of the thickness profile of the strip from a predetermined thickness profile.

13 Claims, 7 Drawing Figures

STRIP PROFILE MEASUREMENT

This invention relates to radiation gauges for measuring the profile of strip, for example steel or aluminium strip. Such gauges find particular application in hot strip mills, where it is generally possible to correct the profile, when known.

Contactless radiation gauges are known in which an X-ray tube and detector are located in opposite arms of a C-frame which is positioned around the strip with one arm above and one arm below the strip; this X-ray tube and detector assembly monitors the thickness of the strip along the center line as the strip passes through the C-frame. A further X-ray tube and detector are mounted in opposite arms of another C-frame which shuttles back and forth across the strip at right angles to the direction of motion of the strip. The output signal from the shuttling source/detector assembly is compared with the output signal from the stationary assembly which, being located on the center line is used as a reference, and the thickness profile across the strip is displayed, for example on a cathode ray tube.

This type of radiation gauge suffers from a major disadvantage associated with the time required for the shuttling source/detector assembly to traverse the width of the strip. This time can be as long as ten seconds, and with the strip travelling at up to 60 miles an hour, this means that the strip will have advanced about 880 feet in the time required for a single traverse. The result is that the profile measured is not taken along a line at right angles to the direction of travel of the strip, but rather along a diagonal line which may be of the order of 880 feet long although the strip is only, say, 4 feet wide. As the thickness of the strip can vary not just across its width, but also along its length, this diagonal profile results in confusion between the two variations.

An object of the present invention is to provide radiation gauge with which the profile is measured more nearly across the width of the strip substantially at right angles to the direction of motion of the strip.

According to the present invention, therefore, there is provided a radiation gauge for measuring the profile strip travelling therethrough, comprising:

at least one X-ray tube disposed on one side of the strip for producing a beam of radiation in the form of a curtain intersecting said strip in a zone extending across at least part of the width of the strip substantially at right angles to its direction of travel;

a plurality of radiation detectors disposed on the other side of said strip, said detectors being spaced across at least part of the width of the strip corresponding to said irradiated zone and arranged to detect radiation which has passed through the strip in said zone; and output signal means responsive to the detectors to produce respective output signals each representative of the thickness of the strip in a respective part of said zone.

The invention will now be described by way of example with reference to the preferred embodiment illustrated in the accompanying drawings in which:

FIG. 1 is a sectional view throgh the C-frame portion of the gauge which is illustrated in position on a strip mill, showing the physical layout of the X-ray tubes and of the detectors.

FIGS. 2a and b show in plan view the slotted beam-shaping rings of FIG. 1.

FIG. 3 is an electrical schematic diagram of the X-ray tubes.

FIGS. 4a and e are wave forms of the driver output pulses, the voltages generated across the transformer secondaries and the resultant voltage applied to the two X-ray tubes.

Figure 1:
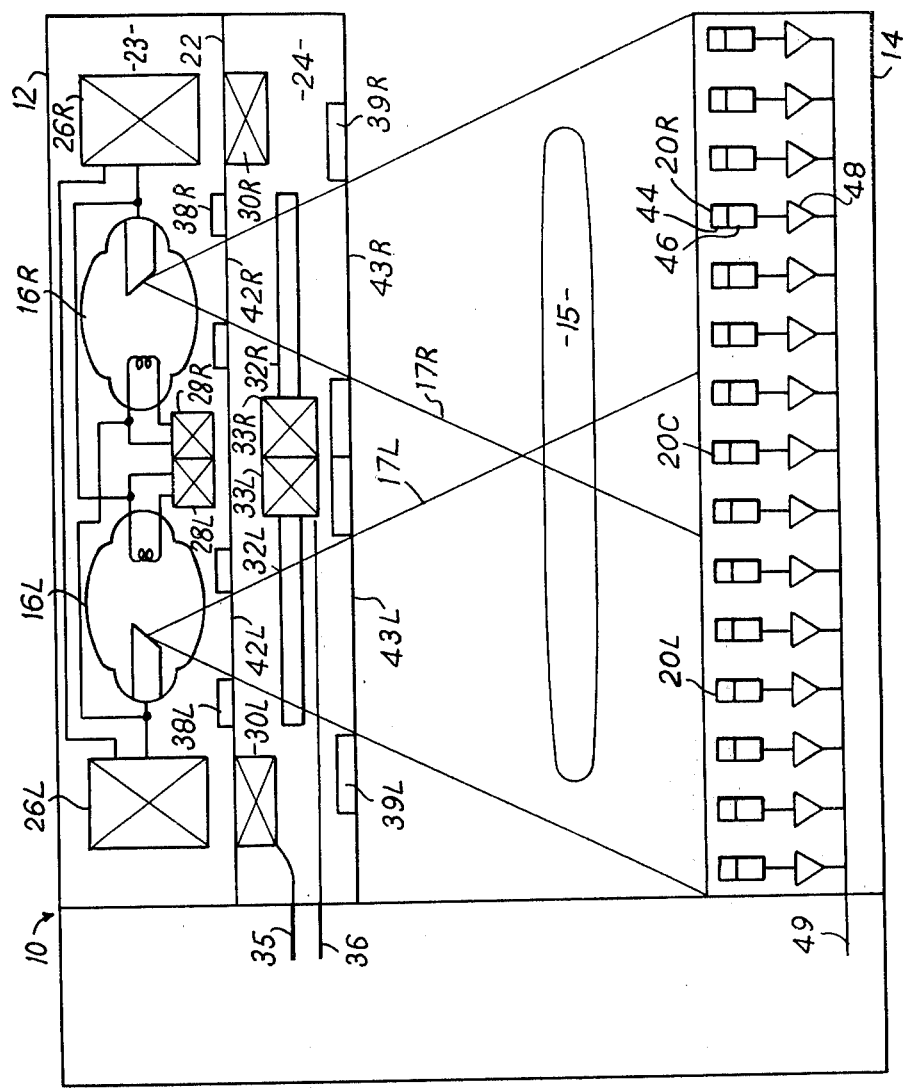

Referring first to FIG. 1, this shows the portion of the gauge disposed in a C-frame 10 having an upper arm 12 and a lower arm 14. The C-frame is placed on a carriage (not shown) and wheeled up to the strip 15, which may for example be hot steel strip. The C-frame 10 is positioned between two adjacent rollers (not shown) which support the strip 15 and drive it in a direction at right angles to the plane of the Figure. The arms 12 and 14 lie respectively above and below the strip 15, and at no place does the gauge make contact with the strip.

The upper arm 12 contains two X-ray tubes 16L and 16R respectively. The suffixes L and R stand for left and right and will be used for other elements as well. The suffix C will be used later on for elements in the central measurement channel. Where it is not necessary to distinguish between left, right and centre, the suffixes may be dropped. The tubes 16L and 16R produce respective X-ray beams 17L and 17R which pass through the strip 15 and are detected by a plurality of detectors 20L, C and R housed in the lower arm 14.

The upper arm 12 is divided by an internal horizontal wall 22 into an upper compartment 23 and a lower compartment 24, both of which are made of steel as is the rest of the C-frame 10. The upper compartment 23 is filled with oil and contains the X-ray tubes 16L and 16R. It also contains high tension transformers 26L and 26R which provide the high potential difference required to fire the tubes, as well as filament transformers 28L and 28R which heat the filaments of the X-ray tubes.

The lower compartment 24, which contains normal air, houses drivers 30L and 30R for the transformers 26L and 26R, as well as two standards magazines 32L and 32R — one for each X-ray tube — actuated by corresponding solenoids 33L and 33R. The electric cables for supplying the drivers 30L, R and the solenoids 33L, R are referenced 35 and 36 respectively.

Figures 2A, 2B:
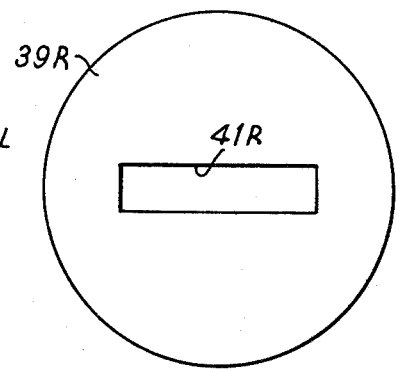

The X-ray beams 17L, 17R produced by the tubes 16L, 16R are each shaped by means of a pair of slotted shaping rings 38L, 39L and 38R, 39R respectively. The rings 38L and 39R are shown in plan view in FIGS. 2a and 2b in which their slots can be seen, which are referenced 40L and 41R respectively; the shape and orientation of these slots defines the shape and orientation of the beams. It will be seen that these slots are elongated in a direction across the width of the strip 15 at right angles to its direction of travel. The slotted beam shaping rings 38L, R and 39L, R therefore define two beams each in the form of a curtain extending across the width of the the strip at right angles to its direction of travel. However as seen in FIG. 1, the beams 17L 17R each extend slightly more than halfway across the strip and overlap in the region of the longitudinal centre line of the strip.

The beam shaping rings 38L, R and 39L, R and made of lead and are substantially opaque to X-radiation. The slots in these rings are covered with windows 42L, R and 43L, R which are transparent to X-radiation and may be made for example of a thin sheet of berylium or aluminium.

The detectors 20, contained in the lower arm 14 of the C-frame 10, are spaced apart in a line across the width of the strip 15 and are positioned so as to receive the radiation in the beams 17L and 17R, after this radiation has passed through the thickness of the strip 15. The detectors 20L receive the radiation from the beam 17L and the detectors 20R receive radiation from the beam 17R. The central detector 20C receives radiation from both beams in the overlap region, and is considered as falling into both the left and right groups. This central detector 20C is used for monitoring the thickness of the strip along its centre line, as will be explained in more detail later on.

Each detector 20 constitutes the beginning of a separate measurement channel, and comprises a scintiliation crystal 44, which may be made out of sodium iodide for example, followed by a photomultiplier tube 46. Each photomultiplier tube is in turn followed by a current to voltage converter 48. The output signals from the converters 48 are transmitted separately along conductors which are bundled together to form a cable 49, which leads from the C-frame located at the mill to a remote console which houses the signal processing circuits. The console will be described later on with reference to FIG. 5.

The absorption of X-radiation as it passes through the material 15 between the X-ray tubes 16 and the detectors 20 is used to measure the thickness of the material, in accordance with Bouquer's exponential law of absorption:

$$I = I_0 e^{-\mu x}$$

wherein:

$I$ is the final (residual) intensity of the X-radiation as detected by the detectors 20, $I_o$ is the initial intensity of the X-radiation, $\mu$ is the transmission coefficient of the material, and $x$ is the thickness of the material.

For an alloy of constant composition and temperature, the gauge can be calibrated to read directly in thickness $x$, or, as is more usual, in % deviation (+ or −) from a nominal thickness.

Figure 3:
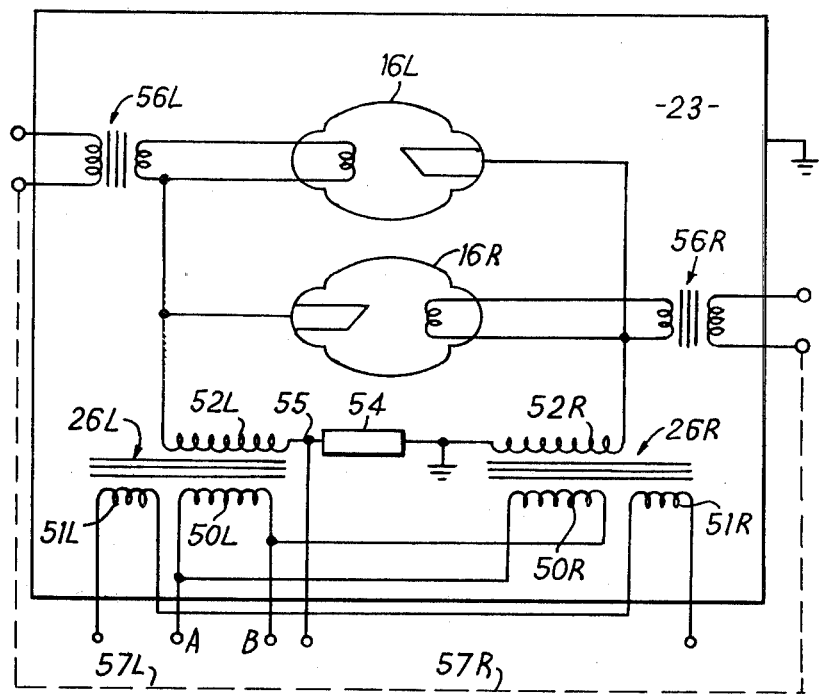

FIG. 3 shows the electrical schematic diagram of the two X-ray tubes 16L and 16R disposed in the oil-filled steel compartment 23. The high tension voltage transformer 26L and 26R each comprise a primary 50L, 50R and a secondary 52L, 52R. The primaries 50L, 50R are connected in parallel to receive at terminals A, B, the positive and negative driver pulses shown in FIGS. 4a and 4b. The secondaries 52L, 52R are connected together in series across both X-ray tubes 16L and 16R which are mounted in parallel with each other but with opposite polarity. The secondaries 52L and 52R are connected together through a resistor 54, one end of which is grounded, as is the steel tank forming the compartment 23. The other end of the secondary 52L is connected to the cathode of the tube 16L and to the anode of the tube 16R, whereas the other end of the secondary 52R is connected to the anode of the tube 16L and to the cathode of the tube 16R.

The sum of the voltages developed in the secondaries 52L and 52R is applied across each of the X-ray tubes 16L, 16R, but with opposite polarity. How each tube fires only when its anode is positive with respect to its cathode, so that the tubes fire alternately, the tube 16L firing on, say, the positive half-cycles of the algebraic sum of these voltages and the tube 16R firing on the negative half-cycles.

As the common point of the two secondaries 52L and 52R is grounded, the maximum voltage to ground is only one half of the maximum voltage applied across the X-ray tubes, which minimises the risk of the electrical breakdown.

Figure 4:
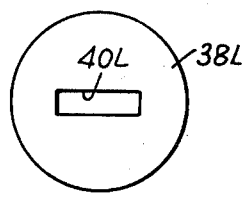

The tubes are driven in push/pull from a transistorised driver circuit 30L, 30R (FIG. 1). This driver circuit generates a train of positive square wave pulses shown in FIG. 4a and a train of interlaced negative square wave pulses shown in FIGS. 4b. These pulse trains are applied to the parallel primaries 50L and 50R, and generate high tension sine wave-like voltages in the secondaries 52L and 52R. The secondary voltage wave forms are shown respectively in FIGS. 4c and 4d, and the algebraic sum of these voltages, shown in FIG. 4e, is applied across the two X-ray tubes. The tube 16L fires on the positive half cycles of the combined voltage of FIG. 4a and the tube 16R fires on the negative half cycles of this voltage. The frequency of the pulse trains shown in FIGS. 4a and b, and hence the frequency of the final voltage applied to the X-ray tubes and shown in FIG. 4e, is chosen in this particular example as 364Hz.

The X-ray tubes 16L and 16R are each provided with a filament transformer 56L and 56R respectively; these filament transformers determine the magnitude of the X-ray current through the tubes. The value of this current is represented by the voltage appearing at the live end 55 of the resistor 54 in series with the high tension secondaries 52L and 52R. This voltage is applied via paths 57L and 57R to the respective primaries of the filament transformers 56L and 56R in a feedback loop so as to maintain the X-ray current at the value desired.

The voltage in kilovolts (KV) applied across the X-ray tubes should also be maintained at a particular value, which is predetermined as a function of the composition of the alloy whose thickness profile is to be measured and also as a function of the nominal thickness desired. For this purpose, the high tension transformer 26L and 26R are each provided with a reference winding 51L, 51R on the primary side of the transformer, and these reference windings detect the voltage across the secondary and are used in a feedback loop to control the driver circuits so as to maintain the secondary voltage at the desired value.

Figure 5:
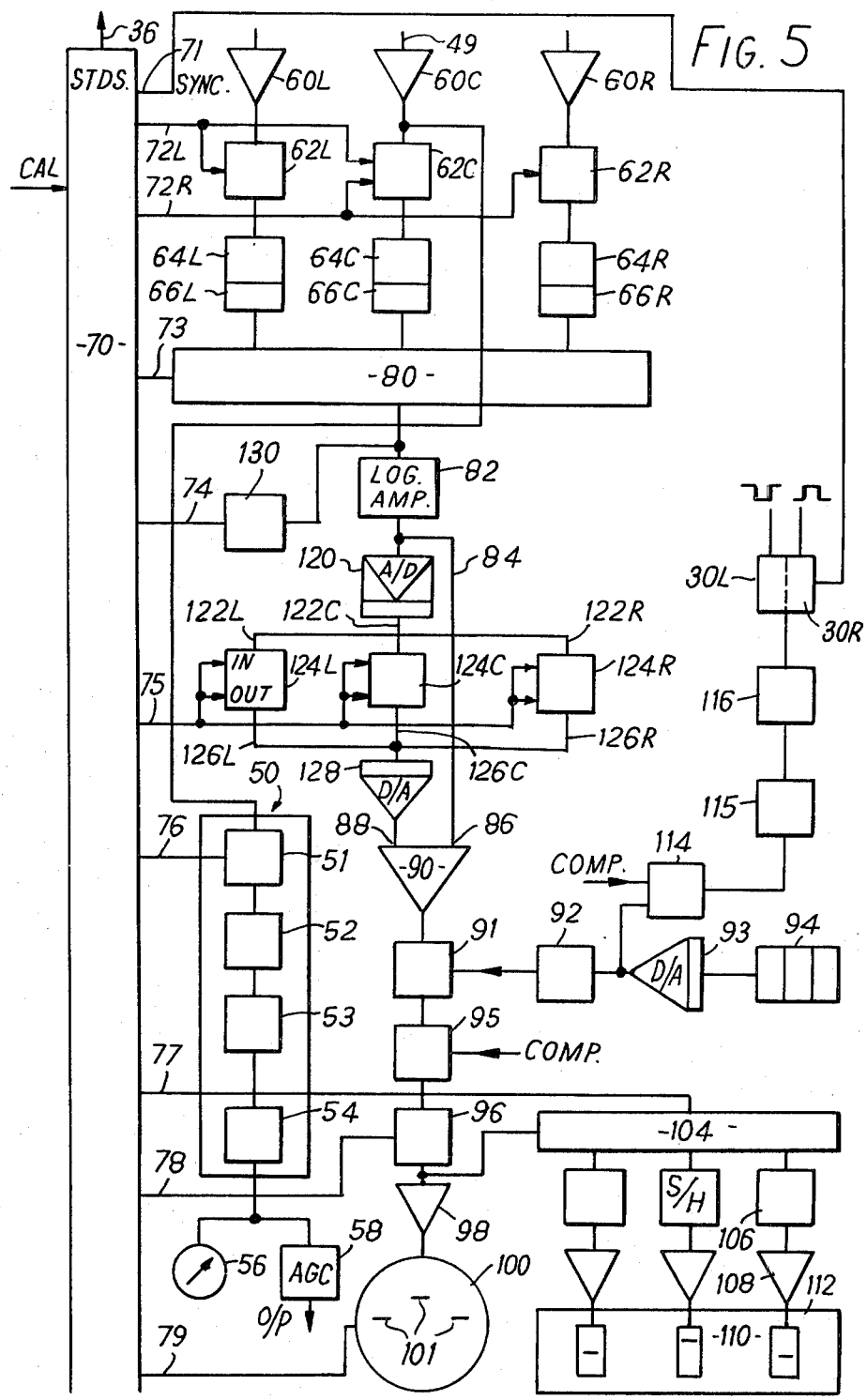
FIG. 5 is a block schematic diagram of the signal processing portion of the gauge, this portion being located in a console remote from the C-frame portion shown in FIG. 1.

Turning now to FIG. 5, this shows the signal processing circuitry of the gauge, which can be mounted in a console some distance from the C-frame 10 shown in FIG. 1. The signal processing circuitry in the console has as many channels as there are detectors 20 (FIG. 1) at the mill. However, for the sake of simplicity in FIG. 5, only one left-hand channel and one right-hand channel have been shown, as well as the central channel.

Each channel in the console comprises an input amplifier 60 serving as an interface. This amplifier receives its signal from the current to voltage converter 48 following its corresponding detector 20, both of which are located in the C-frame 10 and are shown in FIG. 1.

In the console the signal is passed from the interface amplifier 60 through a gate 62 to a peak detector 64. The signal in the peak detector 64 is sampled and integrated in an integrator 66. The integrator 66 is in the form of an RC filter having a time constant of, say, 50 or 100 milliseconds, so as effectively to produce a time-weighted integral (or average). The weight given to each pulse decreases exponentially with the time elapsed since the pulse was received, so that the most recent pulses have the most effect, thereby continually updating the integral.

The gates 62 of the various detection channels are opened and closed by a sequence controller 70 via the lines 72L and 72R for the left hand gates 62L and the right hand gates 62R respectively. The central gate 62C is operated together with both the left gates and the right gates, for the central channel receives radiation from both the left and right hand X-ray tubes 16L, 16R. The left hand gates are timed to open when the left hand tube is being pulsed and the right hand gates are timed to open when the right hand tube is being pulsed.

The sequence controller 70 also controls, via a line 73, a multiplexer 80 which takes the integrated signal from each integrator 66 and feeds it in turn to a logarithmic amplifier 82 which is common to all the channels. The logarithmic amplifier 92 linearises the signal, for, as mentioned above, the signal generated by the detectors varies exponentially with the thickness of the material being measured, in accordance with Bouquer's law. The output of the logarithmic amplifier 82 is transmitted via a line 84 to one input 86 of a differential amplifier 90. The other input 88 of this differential amplifier receives a zero correction signal for the corresponding channel. These zero correction signals are in general different from one channel to another, and they are fed to the differential amplifier in sequence together with the integrated measurement signals for the various channels. The differential amplifier 90 subtracts the zero correction signal received at its input 88 from the measurement signal received at its input 86. The manner in which the zero correction signal is produced and stored for each channel will be described later on.

The output of the differential amplifier 90 is passed to a multiplier 91 where it is multiplied in a conventional manner by $1/\mu x$, taken from Bouquer's law above. The factor $\mu$ is the transmission coefficient of the material whose thickness is being measured. The factor $x$, which in this case is the nominal thickness of the material (instead of the actual thickness), is included so that the resultant profile measurement will be expressed as a percentage deviation (plus or minus) from the nominal thickness. The function $1/\mu x$ is generated by a function generator 92 which receives its input through a digital to analogue converter 93 from a digital preselector 94 into which the nominal thickness of the strip is manually set by means of thumbwheels.

The signal from the multiplier 91 is passed to another multiplier 95 where it is multiplied in a conventional manner by a compensation factor which compensates for the variation in the composition of the alloy being measured from the standard composition for that alloy. This compensation factor can also take into account variations in temperature.

The output signal from the multiplier 95 is passed through a gate 96, which is controlled by the sequence controller 70 via a line 78, to a buffer amplifier 98, from which it is transferred to the Y input of a cathode ray tube display 100. The X or sweep input of the CRT 100 is controlled from the sequence controller 70, via a line 79, in correspondence with the multiplexer 80. The CRT 100 thus demultiplexes the signals and displays them, as at 101, across the CRT in correspondence with the positions of the detectors 20 (FIG. 1) across the strip being measured.

Instead of or in addition to the CRT display 100, a bar display can also be used. The signal coming from the gate 96 is passed via a line 102 to a demultiplexer 104 which is controlled by the sequence controller 70 via a line 77.

The demultiplexed signals, which correspond to the respective measurement channels, are sampled and held by circuits 106 from which they are passed via buffer amplifiers 108 to a bar display 110 comprising an edgewise meter 112 for each channel.

The manual preselector 94 for setting the nominal thickness of the strip also controls the voltage applied across the X-ray tubes 16. The digital signal from the preselector 94, after being converted to analogue form in the D/A converter 93, is passed to a multiplier 114 where it is multiplied by the compensation signal. The output signal from the multiplier 114 is fed to a function generator 115 which generates the function of $x$ (nominal thickness) in accordance with which the anode-cathode voltage of the tubes is to vary, this voltage increasing with increasing nominal thickness. The function generator 115 controls a voltage generator/regulator 116, which in turn controls the drives 30L, R (also shown in FIG. 1). As seen previously, these drives produce the square wave pulse trains, shown in FIGS. 4(a) and 4(b), which are applied to the terminals A, B of the transformer primaries 50L, R. The drivers 30 are synchronised with the sequence controller 70 via a line 71.

In addition to the various measurement channels described above, the thickness of the strip along its centreline is monitored in a separate channel 50, sometimes referred to as the translator channel. This channel 50 comprises a peak detector 51 which receives the measurement signal from the central buffer amplifier 60C through a gate which is controlled by the sequence controller 70 via a line 76. This gate (which is not shown separately from the peak detector 51), like the gate 62C of the central measurement channel, is opened for the pulses produced by both the left and the right X-ray tubes.

The peak detector 51 is followed by a logarithmic amplifier 52 for linearising the signal, which in turn is followed by an integrator 53 in the form of an RC filter having a time constant of about 50 or 100 ms. The output signal from the integrator 53 multiplied by a compensation signal for compensating for the alloy composition, and, if desired for the temperature. This multiplication is accomplished in a multiplier which is not shown but which is similar to the multiplier 95 of the central measurement channel. An "offset" voltage is subtracted from the compensated output signal coming from the integrator 53, in order to obtain a "deviation" signal. The offset voltage has the same magnitude as the measurement signal when the measurement thickness equals the set thickness (i.e. at zero deviation). The deviation signal is then fed through a buffer amplifier (not shown) to a gain set circuit 54 whose output signal is applied on the one hand via a buffer amplifier (not shown) to a deviation meter 56 and on the other hand via another buffer amplifier (not shown) to an automatic gain control circuit 58. The output from the AGC 58 can be used during operation of the strip mill to control the mill so as to correct for any deviation of the actual centreline thickness of the strip from the nominal thickness.

The manner in which the zero correction for each channel is provided will now be described. The output of the logarithmic amplifier 82, as well as being connected to the measurement input 86 of the differential amplifier 90, is also connected to the input of an analogue to digital converter 120 which converts the analogue signal to digital form. The output of the ADC 120 is connected in parallel, via lines 122, to the inputs of a plurality of tri-state latches 124, one of which is provided for each channel. The latches are used to store the zero correct on signals in digital form. The outputs of the latches 124 are connected in parallel, via lines 126, to the input of a common digital to analogue converter 128, whose output is connected to the correction input 88 of the differential amplifier 90.

The tri-state latches 124 each have two control inputs, namely an IN control input for controlling the entry of the digital correction signal into the latch and an OUT control input for controlling the non-destructive read-out of the signal stored in the latch. The IN and OUT control inputs of each latch 124 are separately controlled for each channel by the sequence controller 70 via a plurality of lines collectively designated 75.

In operation, the operator first calibrates the gauge by pushing the calibrate button CAL. on the sequence controller 70. This automatically causes the selected standards from the standards magazines 32 (FIG. 1) to be inserted in the path of both X-ray beams. These standards are pieces of sheet metal of standard thickness and standard alloy composition. An electronic or electro mechanical servoloop, or manual control (not shown) makes any necessary adjustment to the output of function generator 115 to obtain zero deviation on meter 56, and thus zero deviation on the automatic gain control circuit 58.

The sequence controller then automatically actuates the IN input control of the latches 124, with the standards still in place. This causes the measurement signal, for each channel in turn, to pass from the ADC 120 into its respective latch 124 where it is stored in digital form. The signals stored in the latches thus represent the measurement signals for the various channels with zero thickness deviation from the standard. The standards are then removed from the X-ray beam. When the gauge is used to measure strip of the same thickness as the standards, the measurement signal for each channel will be the same as the zero correction signal stored in the latch of the respective channel. Each time that a measurement signal is passed by the multiplexer 80 through the logarithmic amplifier 82 to the measurement input of the differential amplifier 90 the zero correction signal for the corresponding channel is read out of the latch non-destructively and, after conversion back into analogue form in the digital to analogue converter 128, is compared with the measurement signal in the differential amplifier 90. If the strip is of the same nominal thickness as the standards used during calibration, any deviation in the thickness of the strip from its nominal thickness will be translated by a positive or negative difference signal coming from the amplifier 90, the difference signal being zero for zero thickness deviation.

On the other hand if the nominal thickness of the strip is different from the thickness of the standards, there will be a non-zero, but constant, output from the differential amplifier 90 for zero thickness deviation. However, the display can be made to read zero by adjusting the gain of the buffer amplifiers 98 and/or 108, or by zeroing the CRT display 100 or the bar display 110.

In the embodiment described above, it has been assumed that the detectors were arranged in a single line across the width of the strip at right angles to its direction of motion.

Figure 6:
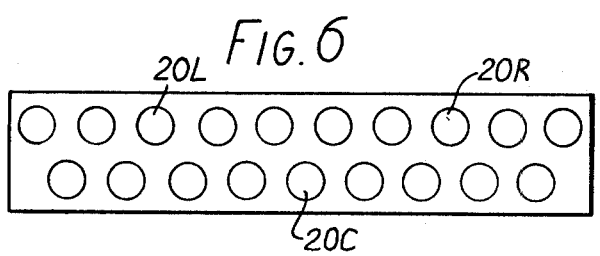
FIG. 6 is a plan view of an alternative embodiment of the detector array.

In order to increase the number of detectors, the detector array of FIG. 6 can be used. In this array, the detectors are arranged in two lins across the width of the strip, the detectors of one line being staggered with those of the other line.

With both detector arrangements, it can happen that the strip width is narrower than the detector array, so that one or more detectors at each end of the array are not covered or completely covered by the strip and therefore receive the X-radiation direct from the source (as shown in FIG. 1, for example). This leads to an excessively large signal in the corresponding channels which would be interpreted as excessively thin strip.

In order to avoid this, the gauge includes an excess signal detector 130 which receives the signals coming from the multiplexer 80, and detects those which exceed a predetermined threshold. The excess signal detector 130 is connected to the sequence controller 70 via the line 74, which enables the channel to be identified in which an excess signal occurs. The sequence controller then closes the gate 96 via the line 78 so that the excess signal does not reach the display. As an additional precaution, the sequence controller can also be arranged to disable the channel immediately inwardly of the one in which an excess signal occurs. Moreover, the outermost detectors can incorporate an electrically operable polariser gate, or other suitable attenuation means, disposed between the crystal 44 and photomultiplier tube 46 and operable in response to the detector 130 to attenuate the light passing between the crystal and the photomultiplier tube in the event that an excess signal is detected, thereby reducing the recovery time required by the photomultiplier tube after saturation.

Finally, the signal processing circuitry of FIG. 5, from downstream of the amplifier 82, can be arranged to operate mainly with digital signals, in which case the greater part of the circuitry, including the sequence controller 70, can be constituted by a microprocessor.

What is claimed is:

1. A radiation gauge for measuring the profile of a strip travelling therethrough, comprising:

a single stationary radiation source disposed on one side of the strip for producing a beam of radiation in the form of a fan-shaped curtain intersecting said strip in a zone extending across at least part of the width of the strip substantially at right angles to its direction of travel;

a plurality of stationary radiation detectors disposed in a line on the other side of said strip, said detectors being spaced across at least part of the width of the strip corresponding to said irradiated zone and arranged to detect the fan-shaped beam of radiation from said single source which has passed through the strip in said zone; and output signal means responsive to the detectors to produce respective output signals each representative of the thickness of the strip in a respective part of said zone.

2. A gauge as claimed in claim 1, further comprising display means responsive to said output signals to produce a display representative of the thickness profile of the strip.

3. A gauge as claimed in claim 1, wherein said source comprises a pair of alternately energized X-ray tubes, each arranged to produce a beam of radiation in the form of a curtain, said tubes being oriented so that their corresponding irradiation zones are aligned across the width of the strip and overlay in the region of the centre line of the strip.

4. A gauge as claimed in claim 3, wherein the two X-ray tubes are arranged in a push/pull configuration, and wherein there is provided means for pulsing them alternately.

5. A gauge as claimed in claim 1, wherein the output signal producing means comprises:
- amplifier responsive to the detectors to produce respective measurement signals each representative of the amount of radiation received by a respective detector;
- respective signal storage means corresponding to each detector for storing respective correction signals each corresponding to the value of the measurement signal produced by the respective detector when the strip is replaced by a standard of predetermined thickness; and
- subtracting means operative when the strip is travelling through the gauge to subtract each correction signal from the corresponding measurement signal to produce a respective one of said output signals;
- whereby each of said output signals is representative of the deviation of the thickness of the strip from said predetermined thickness.

6. A gauge as claimed in claim 5, further comprising multiplexing means for sequentially connecting the amplifying means to each detector, whereby said output signals are produced sequentially.

7. A gauge as claimed in claim 6, wherein each storage means comprises a respective digital store, and wherein the output signal producing means further includes:
- an analogue-to-digital converter arranged to sequentially convert the respective measurement signals produced from each detector in response to said standard into respective digital representations of the values of said measurement signals and to enter each said digital representation into the corresponding digital store as a respective one of said correction signals; and
- a digital-to-analogue converter for sequentially reading the correction signals from each digital store and converting them into corresponding analogue signals for sequential application to the subtracting means.

8. A gauge as claimed in claim 1, wherein the detectors are disposed in a single straight line perpendicular to the direction of travel of the strip.

9. A gauge as claimed in claim 1, wherein the detectors are disposed in two adjacent and parallel straight lines perpendicular to the direction of travel of the strip, the detectors of one line being staggered with respect to the detectors of the other line.

10. A gauge as claimed in claim 3 further comprising automatic gain control means responsive to at least one detector in the region where said beams overlap for generating a gain control signal as a function of the centerline profile of said strip.

11. A gauge as claimed in claim 4 further comprising automatic gain control means responsive to at least one detector in the region where said beams overlap for generating a gain control signal as a function of the centerline profile of said strip.

12. A gauge as claimed in claim 3 further comprising excess signal detection means coupled to said detectors, and means responsive to outputs of said excess signal detection means for temporarily disabling the detectors whose outputs had exceeded a predetermined threshold level.

13. A gauge as claimed in claim 10 further comprising excess signal detection means coupled to said detectors, and means responsive to outputs of said excess signal detection means for temporarily disabling the detectors whose outputs had exceeded a predetermined threshold level.

* * * * *